(12) United States Patent
Shin et al.

(10) Patent No.: US 6,738,514 B1
(45) Date of Patent: May 18, 2004

(54) CHARACTER-RECOGNITION SYSTEM FOR A MOBILE RADIO COMMUNICATION TERMINAL AND METHOD THEREOF

(75) Inventors: Jang-Ki Shin, Suwon (KR); Kyu-Don Lee, Seoul (KR); Joung-Kyou Park, Seoul (KR); Jeong-Goo Lee, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/221,723

(22) Filed: Dec. 29, 1998

(30) Foreign Application Priority Data

| Dec. 29, 1997 | (KR) | ............................................. | 97-75937 |
| May 15, 1998 | (KR) | ............................................. | 98-8068 |
| May 28, 1998 | (KR) | ............................................. | 98-19531 |
| Jun. 10, 1998 | (KR) | ............................................. | 98-21521 |

(51) Int. Cl.⁷ ............................................... G06K 9/00
(52) U.S. Cl. ...................... 382/187; 382/209; 382/218; 382/313; 455/426.1
(58) Field of Search .................... 382/181, 186, 382/187, 188, 189, 185, 190, 209, 218, 229, 278, 307, 313–315; 455/426.1, 575, 550.1, 566, 90, 403, 422.1; 345/104, 173, 175

(56) References Cited

U.S. PATENT DOCUMENTS

| 4,812,833 A | * | 3/1989 | Shimauchi | .................. | 345/175 |
| 4,928,094 A | | 5/1990 | Smith | ......................... | 345/175 |
| 4,972,496 A | * | 11/1990 | Sklarew | ...................... | 382/187 |
| 5,133,076 A | * | 7/1992 | Hawkins et al. | ............. | 708/141 |

(List continued on next page.)

FOREIGN PATENT DOCUMENTS

| EP | 0 562 767 A2 | 3/1993 | |
| EP | 0 623 891 A2 | 5/1994 | |
| EP | 0 651 543 A2 | 10/1994 | |
| EP | 0 721 273 A2 | 1/1996 | |
| EP | 0 705 014 | 4/1996 | ........... H04L/29/06 |

(List continued on next page.)

OTHER PUBLICATIONS

Josephson "DSP–Based Handprinted Character Recognition", Texas Instruments, pp. 1–8, 1996.*
European Search Report dated Jul. 17, 2001 issued in EP Appln. No. 98124788.5–2218.
European Search Report dated Nov. 2, 2001 issued in EP Appln. No. 98124788.5–2218.
European Search Report dated Jan. 2, 2004 issued in a counterpart application, namely, Appln. No. 03021008.2.
European Search Report dated Nov. 20, 2003 issued in a counterpart application, namely, Appln. No. 03021049.6.

Primary Examiner—Daniel Mariam
(74) Attorney, Agent, or Firm—Dilworth & Barrese LLP

(57) ABSTRACT

A character-recognition system provided in a digital mobile communication terminal, comprises a display, a touch panel for generating pressure signals in response to the pressures applied by the characters written on its surface a touch panel drive for generating coordinate data and touch panel state data from the pressure signals, a character data base for storing character data consisting of shapes and stroke data of the characters, a character-recognition for generating the addresses of the precise character data retrieved from the character data base by recognizing the data of the written characters, a character code storage for storing the character codes corresponding to the character data stored in the character data base, and a controller for delivering the stroke data of the written characters calculated from the coordinate data and touch panel state data to the character-recognition means, wherein the controller retrieves the character codes from the character code storage corresponding to the addresses generated by the character-recognition means in response to the coordinate data and stroke data, and display them on the display.

15 Claims, 16 Drawing Sheets

U.S. PATENT DOCUMENTS

| | | | |
|---|---|---|---|
| 5,303,312 A | * 4/1994 | Comerford et al. | 382/189 |
| 5,367,563 A | * 11/1994 | Sainton | 379/93.29 |
| 5,376,945 A | * 12/1994 | Takenaka et al. | 345/115 |
| 5,382,777 A | * 1/1995 | Yuhara et al. | 235/379 |
| 5,491,507 A | 2/1996 | Umezawa et al. | 348/14.02 |
| 5,584,054 A | 12/1996 | Tyneski et al. | 455/566 |
| 5,671,374 A | 9/1997 | Postman et al. | 710/305 |
| 5,699,400 A | 12/1997 | Lee et al. | 378/57 |
| 5,732,152 A | * 3/1998 | Sakai et al. | 382/189 |
| 5,815,142 A | * 9/1998 | Allard et al. | 345/173 |
| 5,896,575 A | * 4/1999 | Higginbotham et al. | 455/566 |
| 5,914,853 A | * 6/1999 | Motoe et al. | 361/680 |
| 5,930,724 A | * 7/1999 | Yanagida | 455/550 |
| 5,956,656 A | * 9/1999 | Yamazak | 455/575 |
| 5,991,441 A | * 11/1999 | Jourjine | 382/187 |
| 5,995,084 A | * 11/1999 | Chan et al. | 345/173 |
| 6,009,338 A | * 12/1999 | Iwata et al. | 455/575 |
| 6,016,134 A | * 1/2000 | Ota | 345/104 |
| 6,023,265 A | * 2/2000 | Lee | 345/173 |
| 6,028,595 A | * 2/2000 | Shiga | 345/173 |
| 6,052,482 A | * 4/2000 | Arai et al. | 382/187 |
| 6,108,445 A | * 8/2000 | Uehra | 382/189 |

FOREIGN PATENT DOCUMENTS

| | | |
|---|---|---|
| GB | 2 289 555 A | 11/1995 |
| JP | 09114926 | 5/1997 |
| JP | 09259218 | 10/1997 |
| WO | WO 95/15065 | 6/1995 |
| WO | WO 97/04578 | 2/1997 |
| WO | WO 97/26744 | 7/1997 |

* cited by examiner

CHARACTER-RECOGNITION SYSTEM FOR A MOBILE RADIO COMMUNICATION TERMINAL AND METHOD THEREOF

BACKGROUND OF THE INVENTION

1. Field of the Invention

The present invention relates generally to digital communication systems, and more particularly, to a character-recognition system for use in a digital mobile communication terminal.

2. Description of the Related Art

As the size of mobile terminals becomes increasingly portable, the operation of such devices has become more difficult for the typical user. The standard keypad is presently capable of providing a variety of functions, however, accessing these functions often requires a user to input a number of key operations, frustrating the user in the process. Moreover, mobile terminals have recently been provided with character data communication service capability as an adjunct to the existing voice capability. As such, additional difficulties arise in that an already overburdened user interface (i.e. keypad) must now serve as the interface for inputting character data in addition to the essential dialing function. Transmitting character data utilizing the limited number of keys on a conventional mobile communications terminal requires a multiplicity of key combinations thus increasing the number of key input operations required of a user. At present, transmitting character data through a conventional mobile communication terminal is carried out in the following three ways. The first way to transmit a message (i.e. character data) is by making a proper combination of key inputs through several key input operations. The second method is to transmit a message previously composed and stored. For example, one of the messages stored in a memory is retrieved for transmission. The third is to make a proper combination of characters displayed on an LCD by operating a specially designed key added to the key pad. Both the first and third methods make it possible to transmit a message as presently composed, but require a large number of key input operations. The second method does not require an inordinate amount of key inputs, however, it is limited in terms of a predetermined content. That is, the message is pre-stored.

Accordingly, it would be highly advantageous to provide methods and an apparatus to facilitate the input of character data in a mobile communication terminal that overcomes the disadvantages inherent in the methods described.

SUMMARY OF THE INVENTION

It is therefore an object of the present invention to provide a mobile communication terminal with a character-recognition system for facilitating the input of character data, and a method thereof.

It is another object of the present invention to provide a mobile communication terminal with a touch panel as a character input unit, and a method thereof.

It is still another object of the present invention to provide a mobile communication terminal with a touch pad adapted for users familiar with conventional key pads.

It is still another object of the present invention to provide a mobile communication terminal with a touch panel interface without substantially increasing the size and structural complexity thereof.

It is still another object of the present invention to provide a mobile communication terminal with a touch panel controlled by suitably utilizing the limited number of the chip selection pins of the modem without substantially modifying the internal structure of the mobile communication terminal.

It is a further object of the present invention to provide a mobile communication terminal with a touch panel mounted on the LCD module of its housing.

According to one aspect of the present invention, a character-recognition system provided in a digital mobile communication terminal, comprises a display, a touch panel for generating pressure signals in response to the pressures applied by the characters written on its surface, a touch panel driver for generating coordinate data and touch panel state data calculated from the pressure signals, a character data base for storing character data consisting of shape data and stroke data of the characters, a touch panel drive circuit for generating the addresses of the precise character data retrieved from the character data base by recognizing the data of the written characters, a character code storage for storing the character codes corresponding to the character data stored in the character data base, and a device which comprises a processor functioning as receiving coordinate data and state data from the touch panel drive circuit, outputting the data to a character-recognition means and driving the character-recognition means, receiving the result value of the character-recognition means, reading out the corresponding character code from the character code storage, and displaying them on the display.

According to another aspect of the present invention, a mobile communication terminal including a display, touch panel, character data base for storing character data, and character code storage for storing the character codes corresponding to the character data stored in the character data base, is provided for with a character-recognition method, which comprises the steps of determining whether a character is inputted within a predetermined time interval in character-recognition mode set by an external input signal, comparing the character data input within the predetermined time with character data stored in a character data base, determining whether the character data base contains a character that matches the input character within some pre-defined error range, and display the input character on the display by reading from the character code storage the character code corresponding to the matching character data.

According to still another aspect of the present invention, a character-recognition system provided in a mobile communication terminal, comprises a modem chip, a touch panel for generating X/Y coordinate data representing a pressure trace made by a pen writing on it, and a touch panel driver having a chip selection input pin for receiving a chip selection signal generated from a chip selection output terminal of the modem chip, an X/Y selection terminal for receiving an X/Y selection signal generated from a first general-purpose output terminal of the modem chip and a data transfer terminal for receiving the X/Y selection signal and transferring the X/Y coordinate data through the same data bus from and to the modem chip.

According to a further aspect of the present invention, a display module interface for a character-recognition mobile communication terminal, comprises a modem chip, a display selection circuit for converting the output signal of a general-purpose write output pin provided in the modem chip into a display enable signal, and a display module having an enable terminal for receiving the enable signal, a command/display data input pin for receiving a command/display data selection signal generated from a general-purpose input/output pin of the modem chip, and a data bus for receiving command/display data through the same data bus in response to the command/display data selection signal.

The above and other objects, features, and advantages of the present invention will be apparent from the following description of preferred embodiments of the invention with reference to the accompanying drawings.

DETAILED DESCRIPTION OF THE PREFERRED EMBODIMENT

Figure 1:
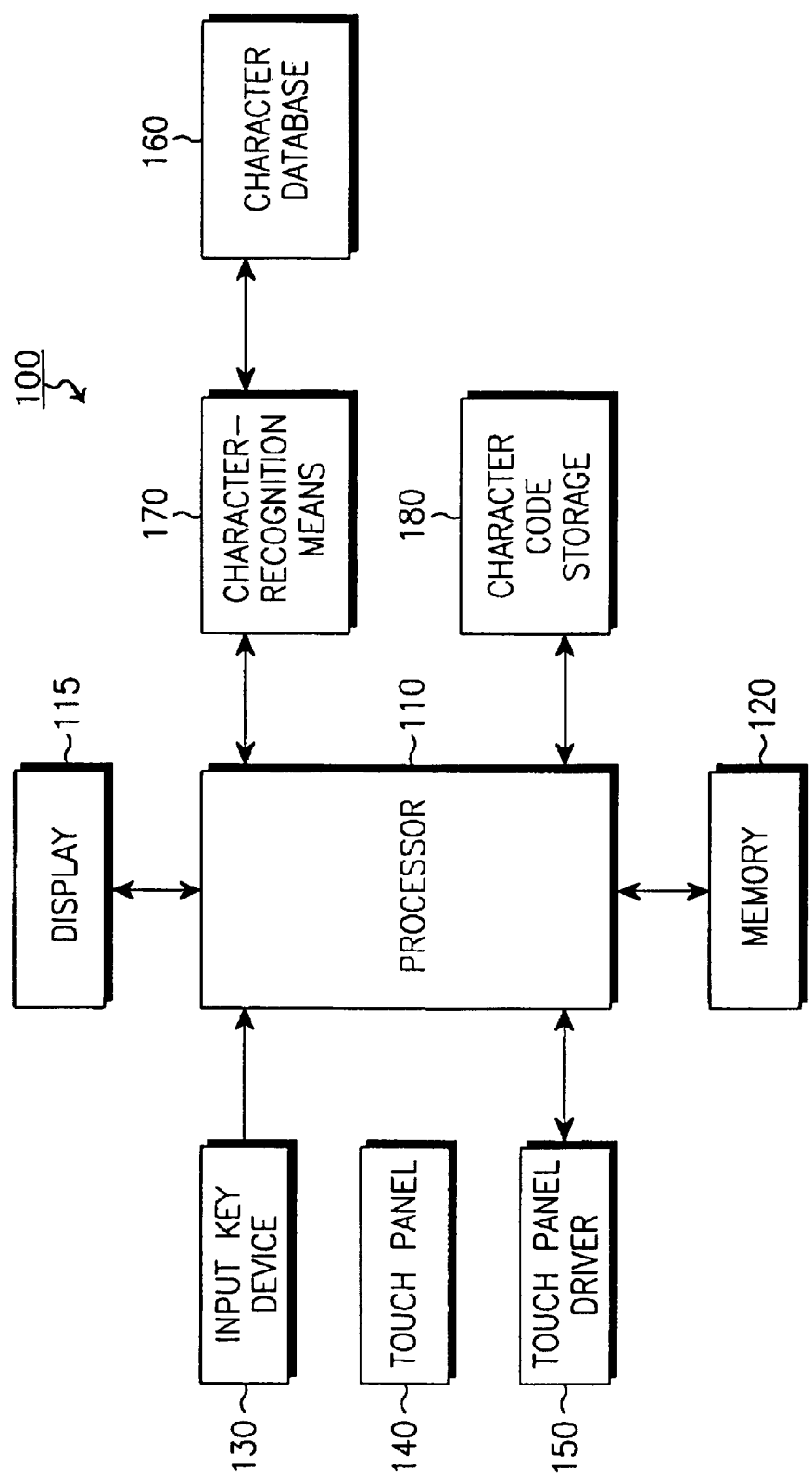
FIG. 1 is a block diagram of a mobile communication terminal including a character-recognition system according to an embodiment of the present invention.

The attached drawing use the same reference numerals to represent corresponding functional units.

FIG. 1 is a block diagram of an embodiment of a mobile communication terminal in accordance with the teachings of the present invention. The shown mobile communication terminal, generally designated with Reference Numeral 100, includes a processor 110, which, in the present embodiment, is a single chip microprocessor for controlling the overall function of the mobile communication terminal 100. An operational program of the mobile communication terminal and data generated in the course of executing the program are stored into a memory 120 such as ram. An input key device 130 includes a plurality of numeric and functional keys preferably used for external key input data. A display 115 displays the key data generated by the input key device 130 as well as various icons and written characters to represent desired information. Inputting of character data is preferably achieved by means of a touch panel 140, which converts the position of pressures applied thereto to electrical signals. A touch panel driver 150 generates digital coordinate data from the pressure signals, and touch panel state data to indicate whether the touch panel 140 has received character data. The controller 110, in response to a touch panel state signal calculates the number of strokes associated with each input character. The processor 110 reads coordinate data. A character data base 160 stores shapes and the number of strokes of each character. A character code storage 180 unit stores the character codes for the character data stored in the character data base. A character-recognition means 170 recognizes a character by comparing the coordinate data and number of strokes, with the character data stored in the character data base 160. The processor 110 receives the storage address for the character code of the recognized character data is stored, and reads the character code from the character code storage 180 to display the character on the display 115.

Figure 2:
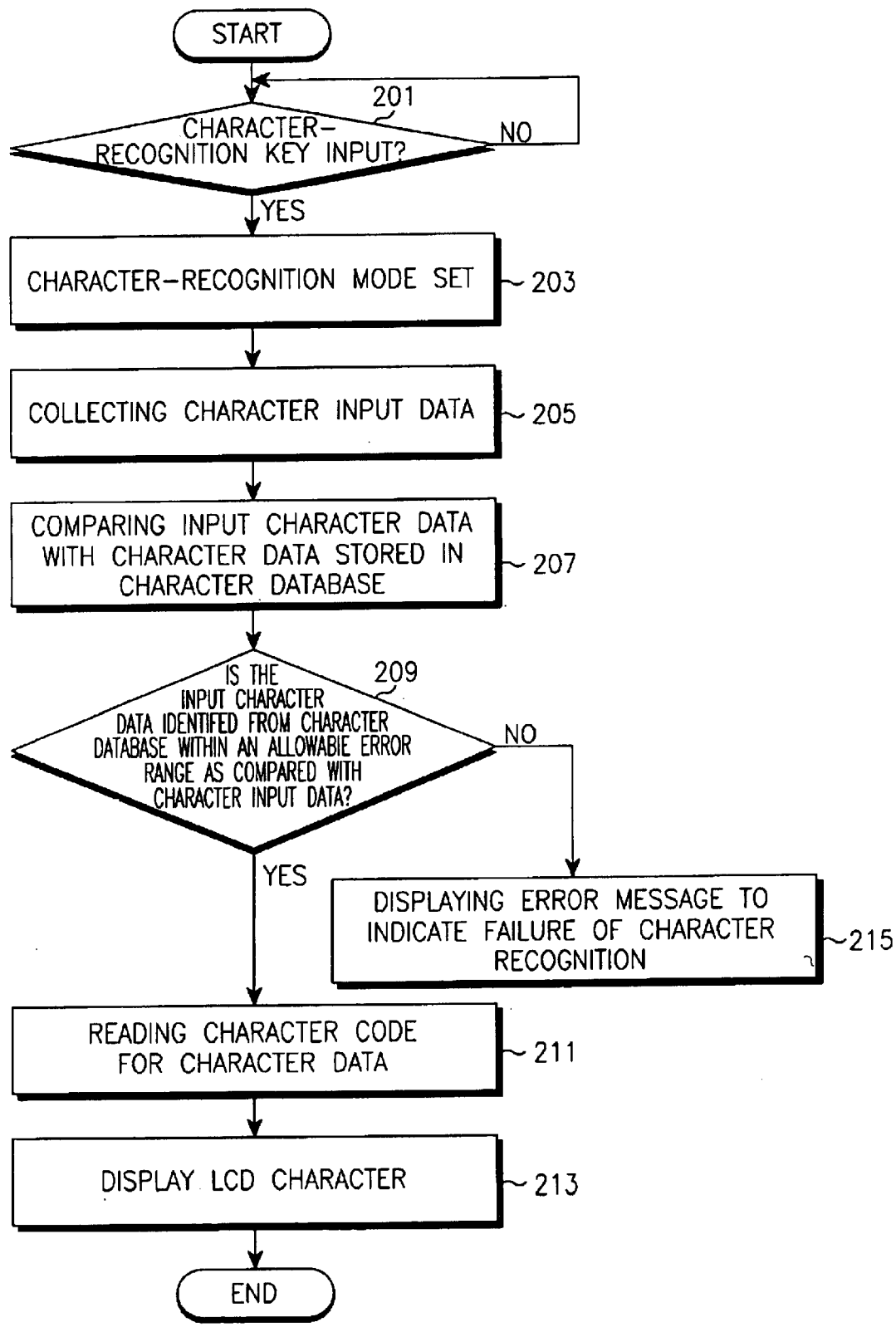
FIG. 2 is a flow chart illustrating the steps for inputting character data through a touch panel in a mobile communication terminal according to an embodiment of the present invention.

FIG. 2 is a flowchart that illustrates the steps performed by the character recognition system. The processor 110 detects a key signal representing character-recognition mode in step 201. Upon detecting the key signal, the processor 110 proceeds to step 203 to set the mobile communication terminal to character-recognition mode. Then, in step 205, if the processor 110 detects a character input applied through the touch panel driver 150 from the touch panel 140 in a predetermined time interval, the process continues at step 207, otherwise the process continues in step 215 where character recognition mode is terminated. In step 207, upon detecting a character input in step 205, the character-recognition means 170 compares the character data received from the touch panel driver 150 with character data stored in the character data base 160. Step 209 is a determination step to decide if the character-recognition means 170 has identified the input character data as a match to a corresponding character in the character data base to within some prescribed error range. If a positive character identification is made by the character recognition means, the processor 110 then receives the address of the character code for the identified character data from the character data base 160 by controlling the character-recognition means 170 in step 211. Thereafter, the processor 110 reads from the character code storage 180 the character code of the address displayed on the display 115 in step 213. However, if the character recognition circuit is not successful, at identifying the character data in step 209, the processor 110 proceeds to step 215 to display an error message to indicate failure of the character-recognition on the display 115.

As a means for inputting hand written (i.e. pen based) characters to the mobile communication terminal, the touch panel requires either an interface to the CPU of the mobile communication terminal or an additional touch panel driver CPU by means of serial or parallel connection using the address or data bus of the CPU. In addition, the interfacing operation may be achieved by either periodically polling the touch panel to read the data generated by the touch panel, or by detecting an interrupt signal generated by the touch panel to read the data. However, this requires an additional control means because the CPU of the mobile communication terminal does not have sufficient capacity to process the additional data generated by the touch panel. For example, interfacing the touch panel through serial means is not practical at a data transmission speed of 19600 bps because the CPU is already burdened with a number of processing tasks. A parallel connection is also problematic in that additional circuits are required to address the touch panel, thereby increasing the size and power consumption of the mobile communication terminal. Such problems may be resolved by the inventive system to be described below.

Figure 3:
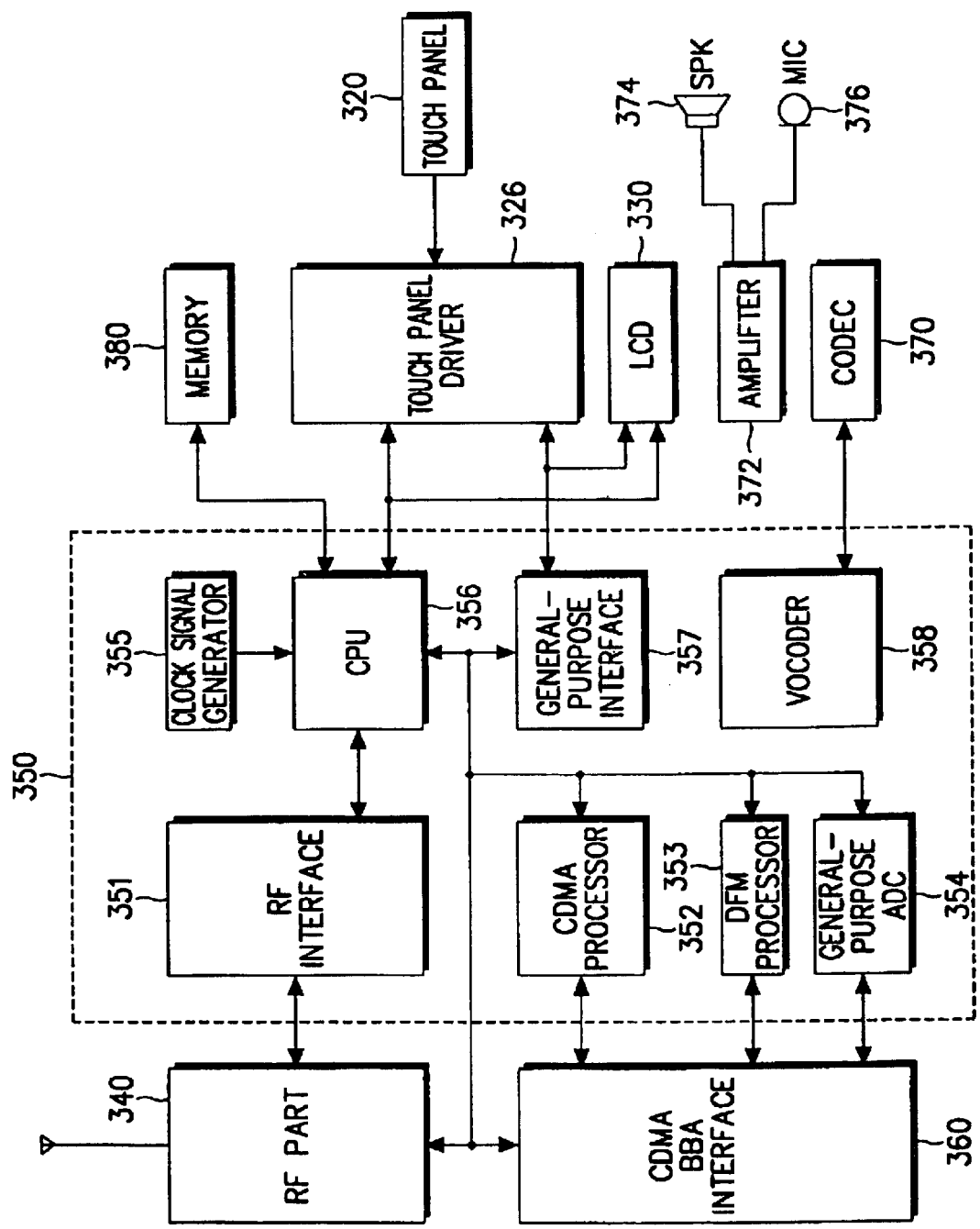
FIG. 3 is a schematic block diagram of a CDMA digital cellular phone including an embodiment of a character-recognition system according to the present invention.

Referring to FIG. 3, there is shown an embodiment of a character recognition system of the present invention. A radio frequency (RF) part 340 is shown which serves to both transmit and receive a radio signal through an antenna depending on the operational mode. The RF part 340 includes a duplexer to separate transmit and receive signals. A CDMA BBA (Based Analog Asic) interface 360 is directly connected with the modem 350 of the mobile communication terminal to match RF signal processing with the digital signal processing. Matching is bi-directional in the present context, in that, in one direction, the CDMA BBA serves to filter the signal from the RF part 340 to the modem 350, and in the other direction, the digital signal is converted from the modem 350 into an analog signal delivered to the RF part 340. The CDMA BBA 360 comprises an A/D converter, D/A converter, LPF(FM/CDMA), frequency divider, voltage controlled oscillator (VCO), control circuit, PLL, mixer, etc. The modem 350 required for the CDMA digital cellular phone may be any standard modem with operating parameters equivalent to the "MSM" chip manufacture by Qualcomm, Co., U.S.A. The MSM chip includes a CPU 356 of '186 microprocessor, CDMA processor 352, DFM processor 353 for processing digital FM signals, Vocoder (358) for processing voice signals, RF interface 351 for controlling transmission level and received gain, clock signal generator 355 for generating a reference clock signal, general-purpose ADC 354 for converting analog signals to digital signals, general-purpose interface (GPI) 357 for interfacing the CPU 356 with peripheral devices such as key pad. The CPU 356 processes data read from and written into a memory 380, Controlling the peripheral devices through the GPI 357. The CDMA processor 3 processes digital signals by CDMA(IS-95), and CDMA data concerning calculation of electric field strength, transceiver AGC circuit, CDMA transmission and receiving spectrum inversion, etc. It is an essential part of the CDMA digital cellular terminal. The DFM processor 353 interfaces with the CDMA BBA interface 360 separating the transmitting and receiving paths to process digital FM signals. The Vocoder 358 is obtained by QCELP Vocoding technology to process CDMA speech sound. It is connected with CODEC 370 to process the sound signals from a speaker 374 and a microphone 376. The GPI 357 is provided with 31 general-purpose input/output terminals GPIO to process data received from or transferred to the peripheral devices. The memory 380 communicates with the CPU 356, storing the program and data for operating the CDMA phone as well as a drive program for operating the character-recognition system. The character-recognition method is accomplished as shown in FIG. 2. The LCD 330 includes an internal buffer to store the data received from the CPU 356, displaying the stored data.

The touch panel 320 is a character input device for generating analog data corresponding to X/Y coordinates responsive to pen pressures exerted by a user. In operation, user supplied pressure is converted into resistance or capacitance values.

The touch panel driver 326 converts the analog data into digital X/Y coordinate data, and generates a touch panel state signal, to transfer the converted data through a data bus to CPU 356 and output the state signal to the general-purpose input/output terminals of the GPI 357. The touch panel driver 326 includes an enable signal input terminal controlled by the CPU, an interrupt output terminal to inform of the operational state of the touch panel 320, data bus for transmitting data, a touch panel output terminal for generating the touch panel state signal, X/Y selection pin for separately delivering X and Y coordinate data, power reset terminal for adjusting the power used by the touch panel 320, and bus high enable (BHE) pin for controlling data transmission speed. In the present embodiment, the touch panel driver 326 is a "TR88L803/804" chip manufactured by Tritech Microelectronics Co, U.S.A. Other chips may be used in other embodiments with the understanding that another chip possesses comparable performance characteristics.

Figure 4A:
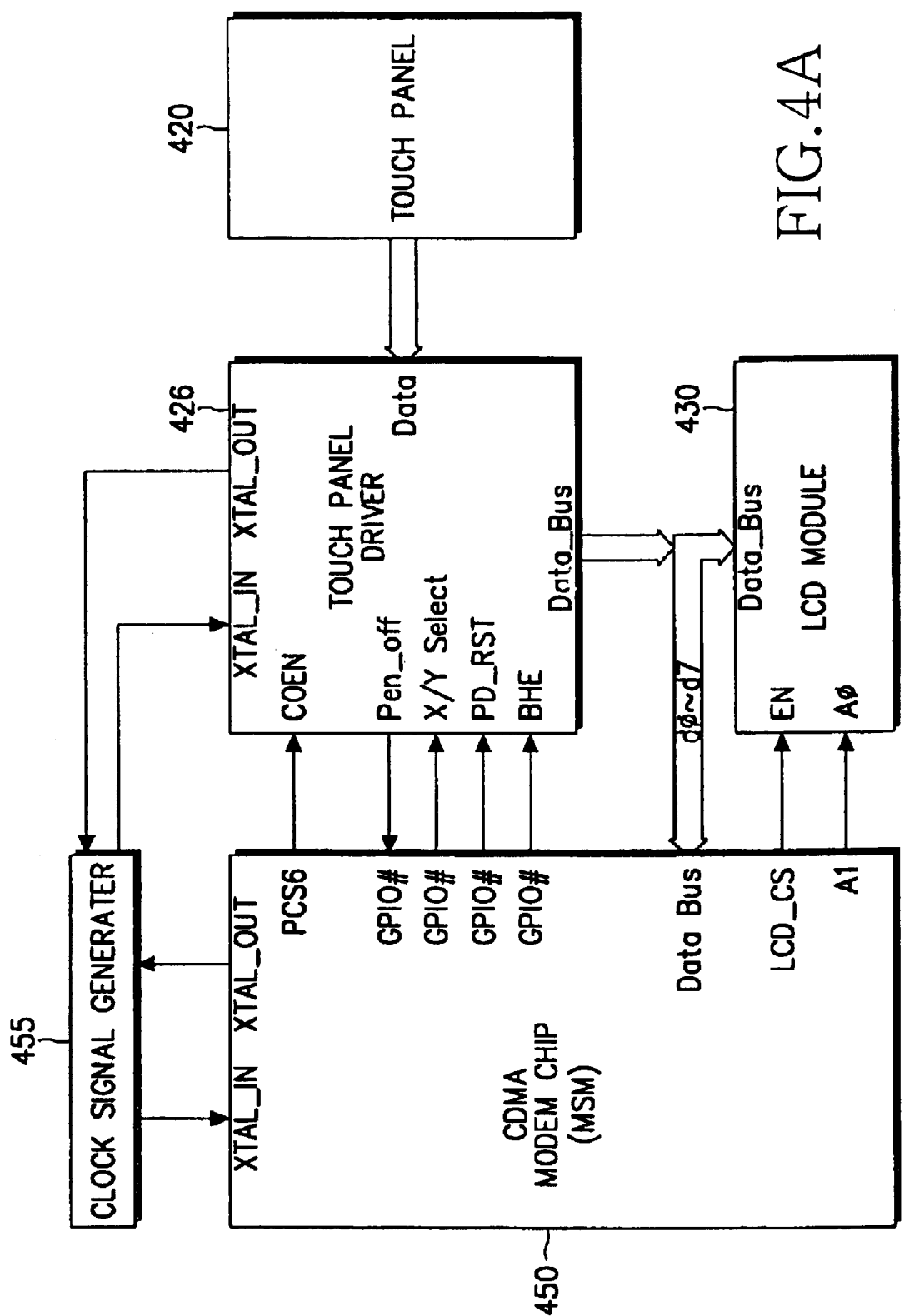
FIG. 4A is a block diagram of an embodiment of a character-recognition system as part of a mobile communication terminal according to an embodiment of the present invention.
Figure 4B:
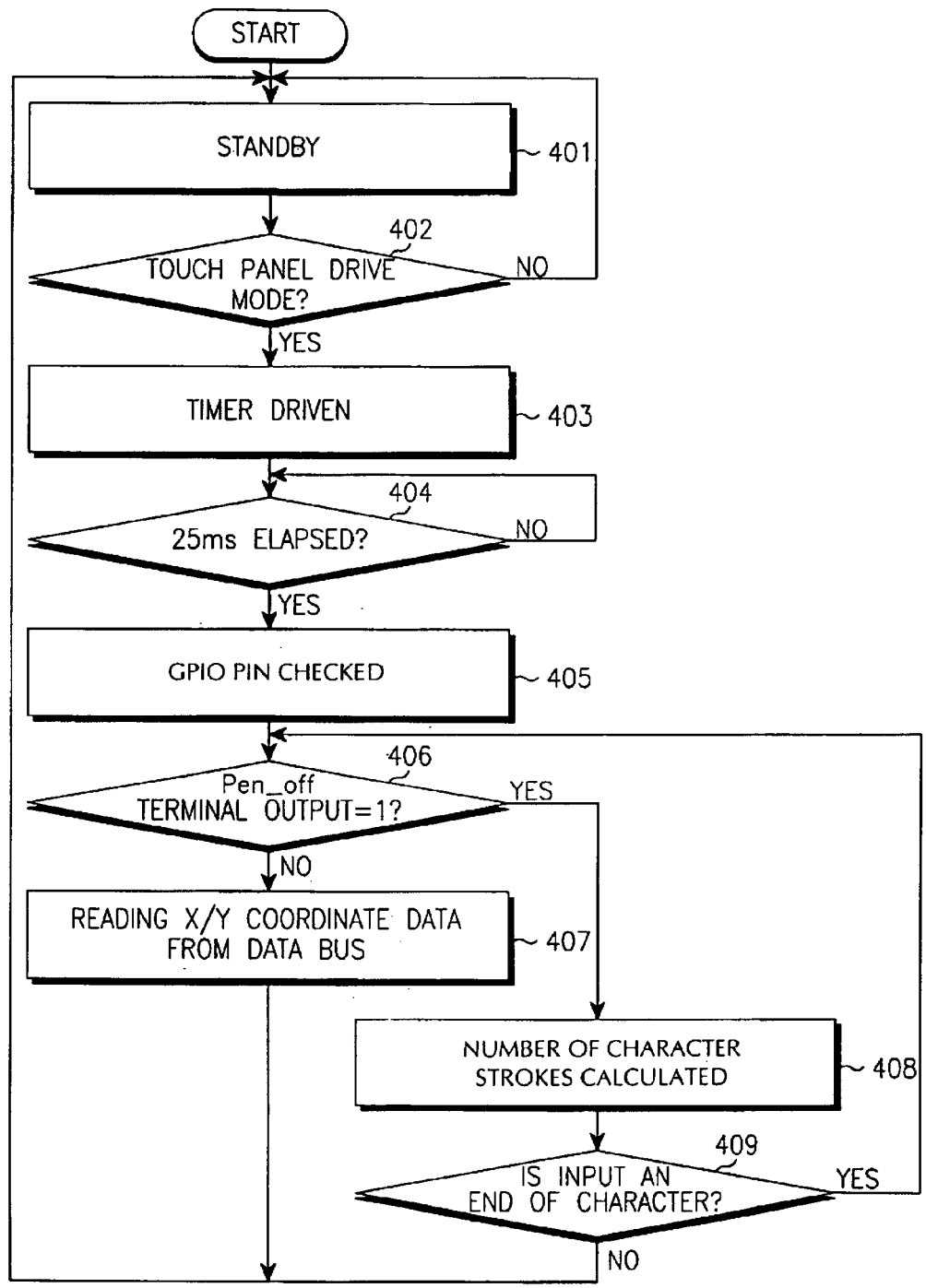
FIG. 4B is a flow chart illustrating the operation of the touch panel interface in a character-recognition system as shown in FIG. 4A.

Referring to FIGS. 4A and 4B. FIG. 4a is a block diagram of an embodiment of a character recognition system in a mobile communication terminal according to the present invention. In the present embodiment, the modem chip of the mobile communication terminal is preferably an MSM chip, and the touch panel driver chip is preferably a "TR88L804" chip. In the present embodiment, the touch panel interface is designed to operate by polling. The touch panel 420 converts a pressure trace made by a pen writing a character thereon into an analog voltage variation to represent X and Y coordinates transferred through a data line. The analog voltage variation is converted by the A/D converter of the touch panel driver 426 into digital X and Y coordinate data. The touch panel driver 426 includes a touch panel driver enable input terminal COEN, touch panel state output terminal Pen_off, data bus terminal Data_Bus of 8-bit transmission for transferring the coordinate data, X/Y coordinate selection pin X/Y Select, power reset pin PD_RST, and transmission speed control pin BHE.

The MSM chip 450 includes touch panel driver enable output terminal PCS6, a plurality of general-purpose I/O (input/output) terminals GPIO, data bus terminal Data_Bus, LCD enable output terminal LCD_CS, and address terminal A1.

In operation, the pin X/Y Select makes it possible to transfer the X and Y coordinate data produced by the touch panel driver through the same data bus, controlled by the CPU of the MSM chip with a general-purpose I/O pin GPIO connected thereto. The touch panel driver enable input pin COEN is connected with the touch panel driver enable output pin PCS6 of the MSM chip 450 to match its data bus with the data bus of the touch panel driver 426. Thus, if the CPU of the MSM chip detects the touch panel being driven, it activates the touch panel driver enable output pin PCS6, connected with the data bus of the touch panel driver. The touch panel state output pin Pen_off is connected with a general-purpose pin GPIO of the MSM chip 450 to inform the CPU of a character input being made through the touch panel, so that the CPU may activate the touch panel driver enable output pin PCS6. If the pin PCS6 is activated, the data bus of the CPU is matched with the data bus of the touch panel driver 426, receiving the X/Y coordinate data. The touch panel state output pin Pen_off is polled to detect the touch panel state signal. The pin Pen_off is connected with a general-purpose terminal GPIO of the MSM chip 450, which is polled by the CPU at predetermined intervals to detect the touch panel state signal in order to activate the terminal PCS6. The touch panel state signal represents the input state of the touch panel.

The power reset pin PD_RST is connected with a general-purpose pin GPIO of the MSM 450 to cut off the power when the touch panel 420 is not used, thereby minimizing the power consumption of the touch panel driver 426. This is to compensate for the power consumption caused by the touch panel 420 and the touch panel driver 426 added to the ordinary mobile communication terminal. The resolution control pin BHE is connected with a general-purpose pin GPIO of the MSM 450 to transfer data having higher resolution than ordinary 8-bit data generated from the touch panel. For example, if 10-bit data is transferred, the CPU firstly sets the pin BHE at high to initially transfer 8-bit data, and then at low to secondly transfer 2-bit data. This results in the touch panel interface to adjust resolution as desired.

Referring to FIG. 4A, the LCD module 430 displays the character data written (i.e. input) by a user via the touch panel for operating the communication pin. The display includes an enable terminal EN, an address terminal and a data bus for receiving displayed data such as character data. The enable terminal EN is connected with the LCD enable output pin LCD_CS of the MSM 450, and the address pin A0 with the address pin A1 of the MSM 450 to operate the LCD module. The data bus of the LCD module 430 is connected with the data bus of the MSM 450. The data bus is also shared by the touch panel driver. Data bus sharing is required as a consequence of a limited number of data buses within the MSM chip. When the CPU activates the LCD enable output pin LCD_CS to enable the LCD module 430 to display the data generated from the CPU, the displayed data is read from the memory provided in the mobile communication terminal. As shown in FIG. 4A, a clock signal generator 455 is provided to generate a reference clock signal for the MSM 450. In addition, the reference clock signal of the clock signal generator 455 is. frequency-divided into submultiples to generate a second reference clock signal for the touch panel driver 420. Or the reference clock may be generated by multiplying the clock signal generator.

FIG. 4b is a flowchart illustrating the operation of the touch panel interface according to the embodiment of the present invention illustrated in FIG. 4a. Referring to FIG. 4b, touch panel drive mode is initiated by an input in step 402 from a standby state in step 401. Upon entering a drive mode, the CPU, of the MSM 450, in step 404, drives a timer 403 to measure a predetermined time interval, preferably on the order of 25 ms, to detect character data written by a user on the touch panel. When the predetermined time interval elapses, a check is made ,in step 406, of the general-purpose I/O (GPIO) pin connected with the touch panel state output pin of the touch panel driver 426 to detect a character data input. Detecting a logical "1" from the terminal Pen_off indicates that no input was applied to the touch panel 420 in step 406. Otherwise if a logical "1" is detected in step 406, the number of the strokes which comprise the character input is calculated in step 408. In the present embodiment, TR88L804 chip for the touch panel driver is adjusted for the pin Pen_off to output logical value of 0 or 1 in accordance with the presence or absence of a touch panel input, respectively. The output of the terminal Pen_off serves as the touch panel state signal to represent whether a character data has been input through the touch panel. Then, in step 409, the CPU checks whether an end of a character is input or not. When an end of character is input, the CPU returns to Step 401, indicating completion of the input of a character. When an end of character is not input the CPU proceeds to step 401 indicating that the process of entering the present input character via the touch panel is not complete.

Figure 5A:
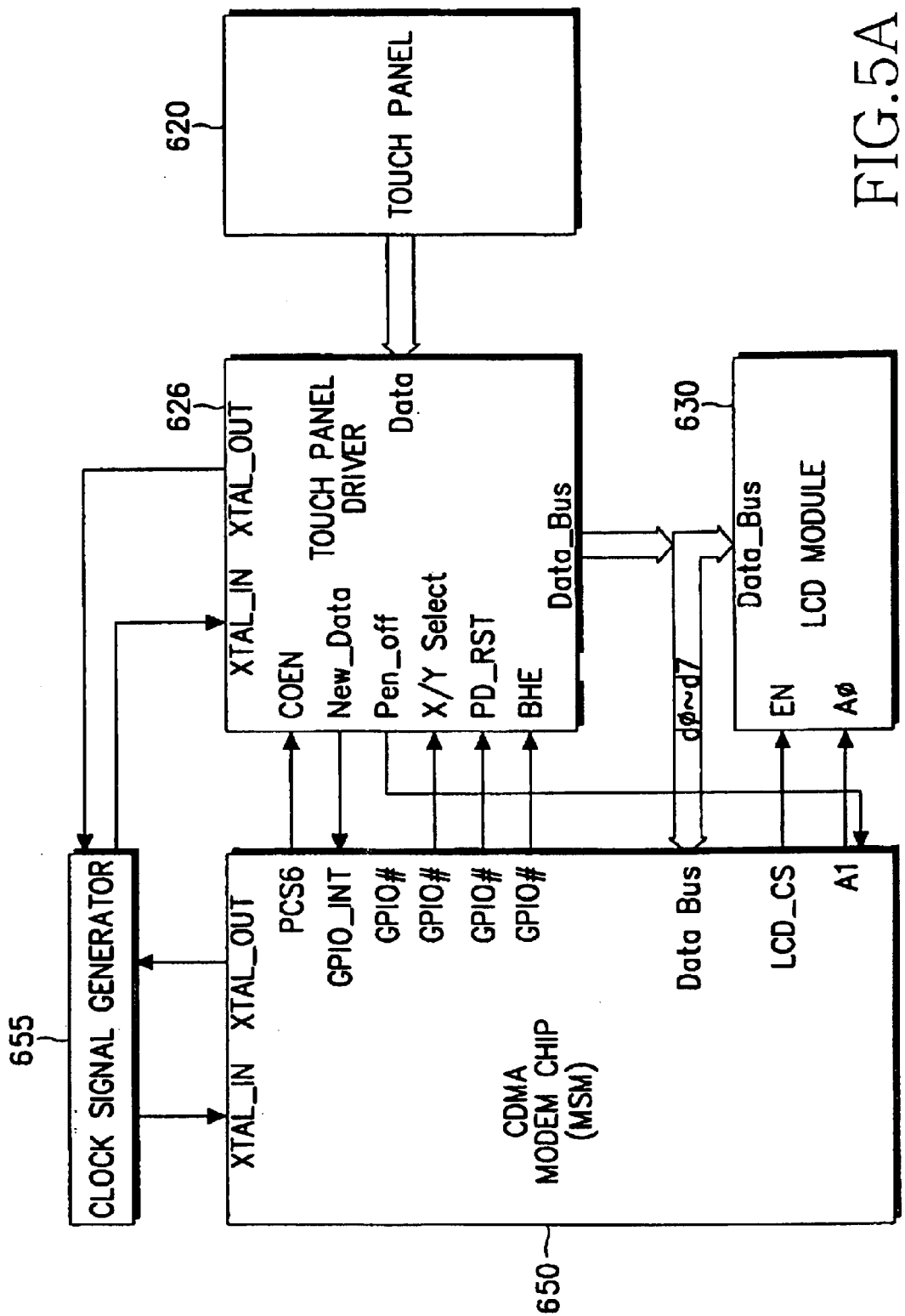
FIG. 5A is a block diagram illustrating a character-recognition system as part of a mobile communication terminal according to a second embodiment of the present invention.
Figure 5B:
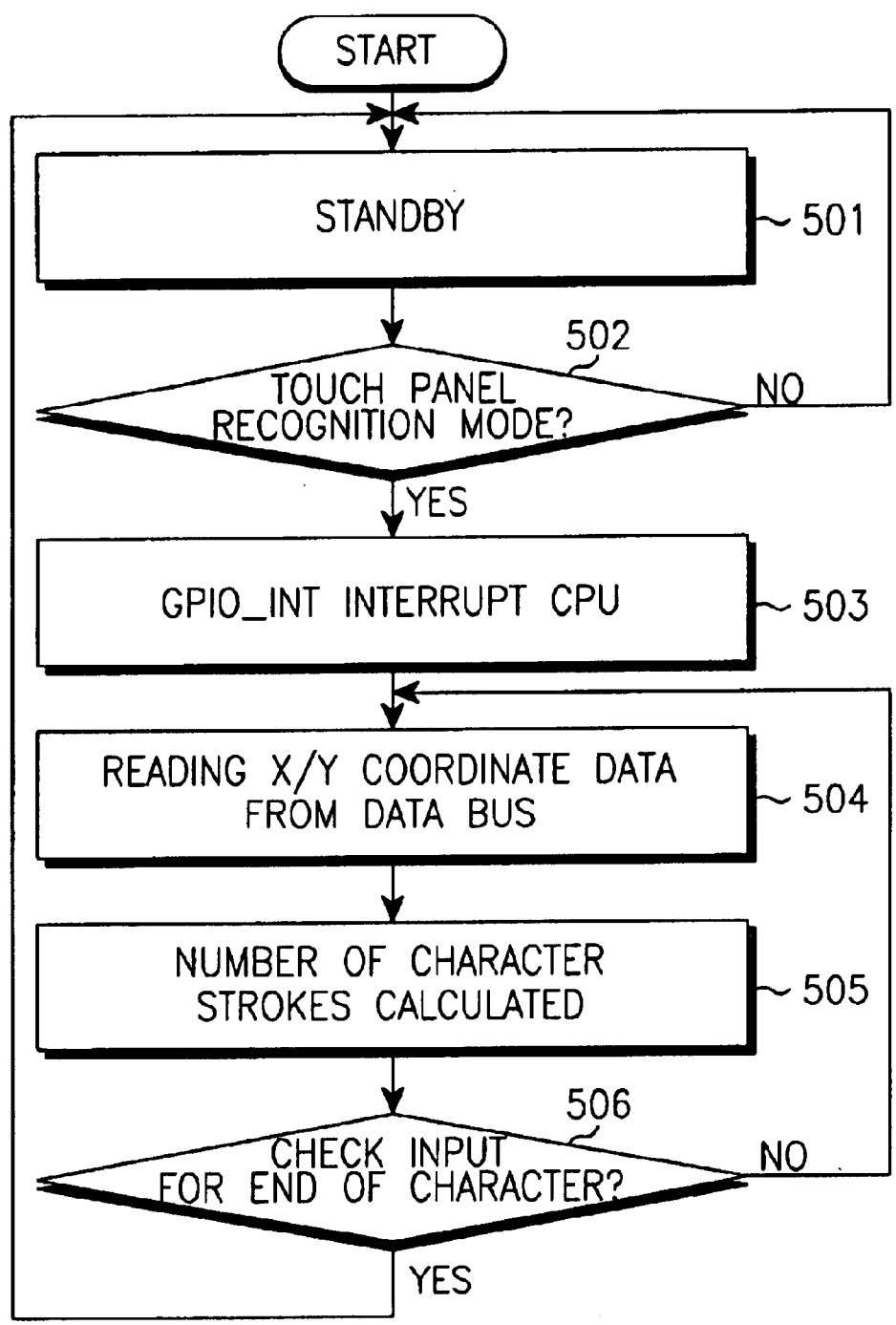
FIG. 5B is a flow chart for illustrating the operation of the touch panel interface of a character-recognition system as shown in FIG. 5A.

Describing the second embodiment of the character-recognition system with reference to FIGS. 5A and 5b, which also uses the MSM chip as the modem chip and "TR88L804" as the touch panel driver, it is important to note that the touch panel state signal is checked by interruption rather than by polling as described in the previous embodiment. To this end, the touch panel driver 526 is provided with a separate interrupt output pin New_Data connected with a general-purpose interrupt input pin GPIO_INT in order to inform the modem chip 550 of a new data input through the touch panel 520. The other pin have the same functions as those of FIG. 4A. The operation of the touch panel interface of the present embodiment is described with reference to FIG. 5b.

FIG. 5B is a flowchart illustrating the operation of the touch panel interface according to the second embodiment of the present invention. Touch panel recognition mode is initiated by an input in step 502 from a standby state in step 501. Upon entering recognition mode, in step 503, the pin GPIO_INT interrupt the CPU to inform a data input. The GPIO_INT is connected with the interrupt output terminal New_Data of the touch panel driver 526. The CPU then reads X/Y coordinate data from the data bus Data_Bus in step 505. Otherwise when no data is detected, the process returns to step 503.

To summarize, when the touch panel 520 is applied with an input, the corresponding X/Y coordinate data is read. Not detecting logical value of "1" from the terminal Pen_off indicates ongoing data input via the touch panel 520 in step 506, whereby the process returns to step 505. The number of the strokes of the character input is then calculated in step 507. In step 508, the CPU checks that an end of a character is input.

As described in the first and second embodiments, the touch panel recognition interface may be achieved by interrupt or polling means to check the touch panel input. The interrupt means is to drive the touch panel driver whenever the touch panel is pressed by a character input while the polling means is to periodically check the touch panel state to drive the touch panel driver.

Figure 6:
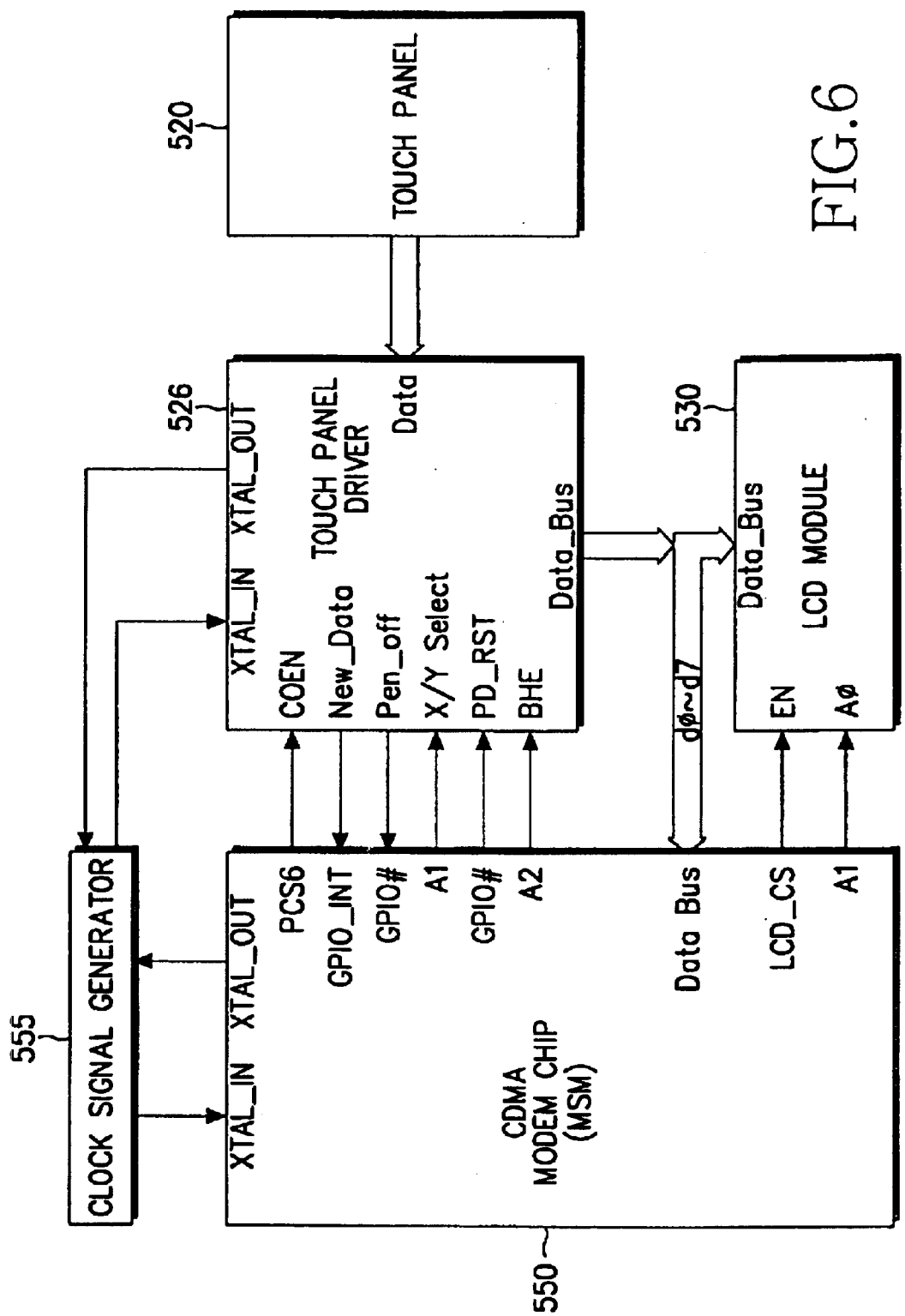
FIG. 6 is a block diagram illustrating a character-recognition system as part of a mobile communication terminal according to a third embodiment of the present invention.

FIG. 6 is a block diagram illustrating a third embodiment of a touch panel recognition interface the present invention. The recognition interface shown in FIG. 6 includes an MSM 650, a touch panel driver 626, a touch panel 620, an LCD module 630 and a clock signal generator 655, which are identical as those described in FIGS. 4A and 5A. However, in the present embodiment the pin X/Y Select of the touch panel driver 626 is connected with address terminal A1 instead of pin GPIO. The motivation for the present embodiment arises from the fact that the MSM chip has a limited number of general-purpose I/O pin GPIO, and the situation may arise where a GPIO terminal is not available to be dedicated to the pin X/Y Select. To further distinguish the present embodiment, the pin BHE is connected with address pin A2 instead of a GPIO pin. In addition, although not shown in FIGS. 4A, 5A and 6, the touch panel state output New_Data may be connected with the key sense pin provided in the MSM chip, where the key sense pin serves to sense the state of the key input.

Figure 7:
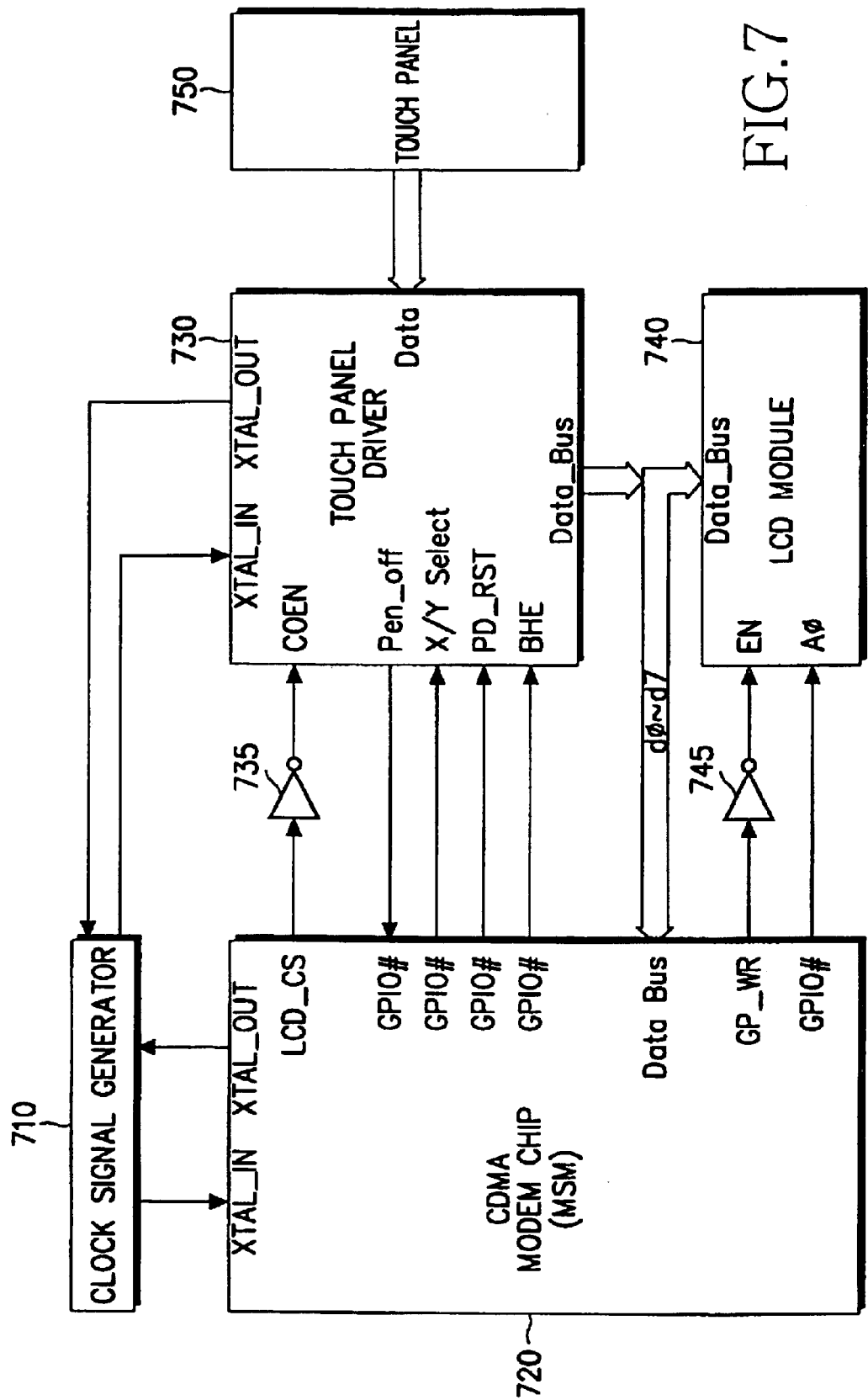
FIG. 7 is a block diagram illustrating a character-recognition system as part of a mobile communication terminal according to a fourth embodiment of the present invention.
Figure 8:
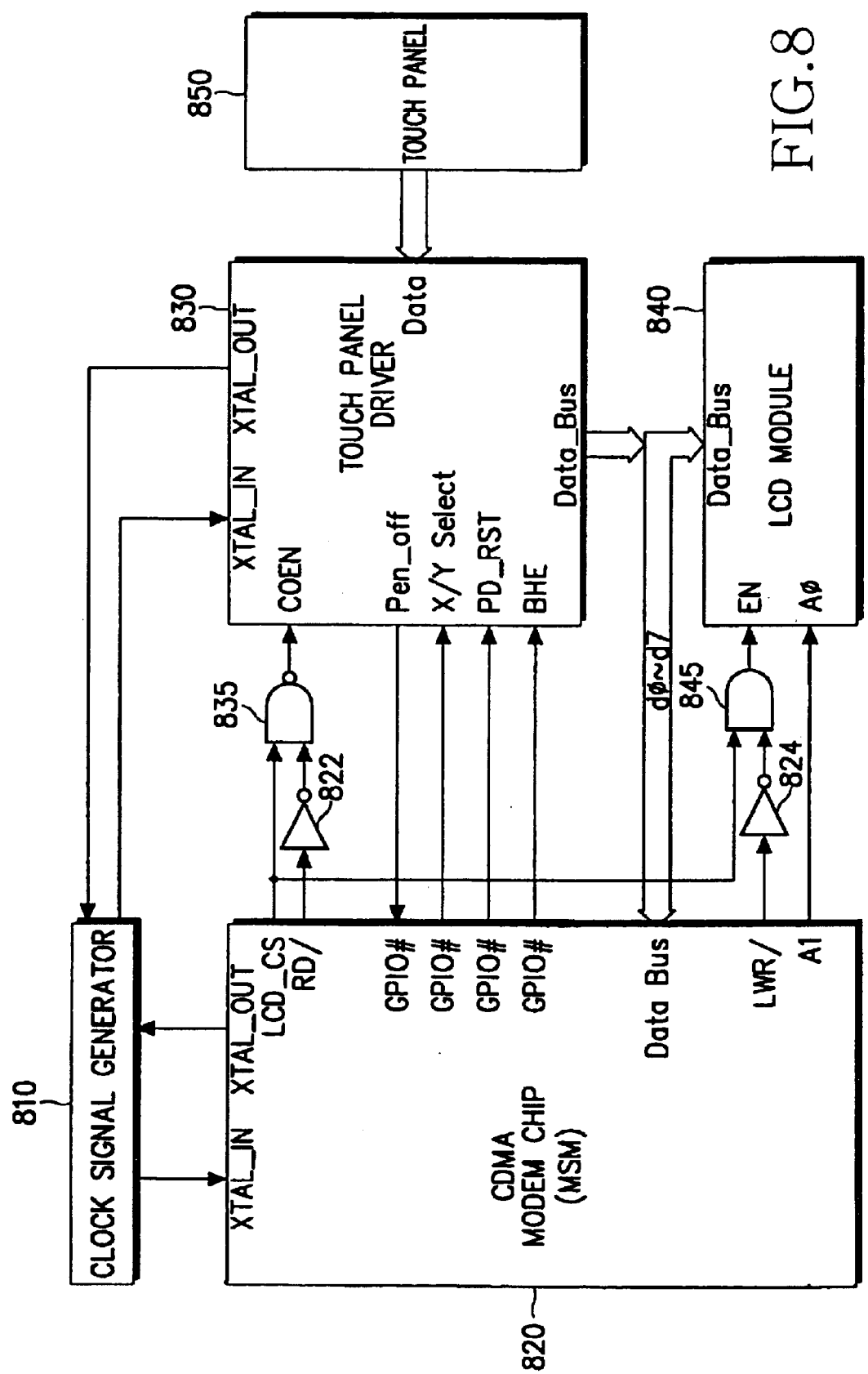
FIG. 8 is a block diagram illustrating a character-recognition system as part of a mobile communication terminal according to a fifth embodiment of the present invention.
Figure 9:
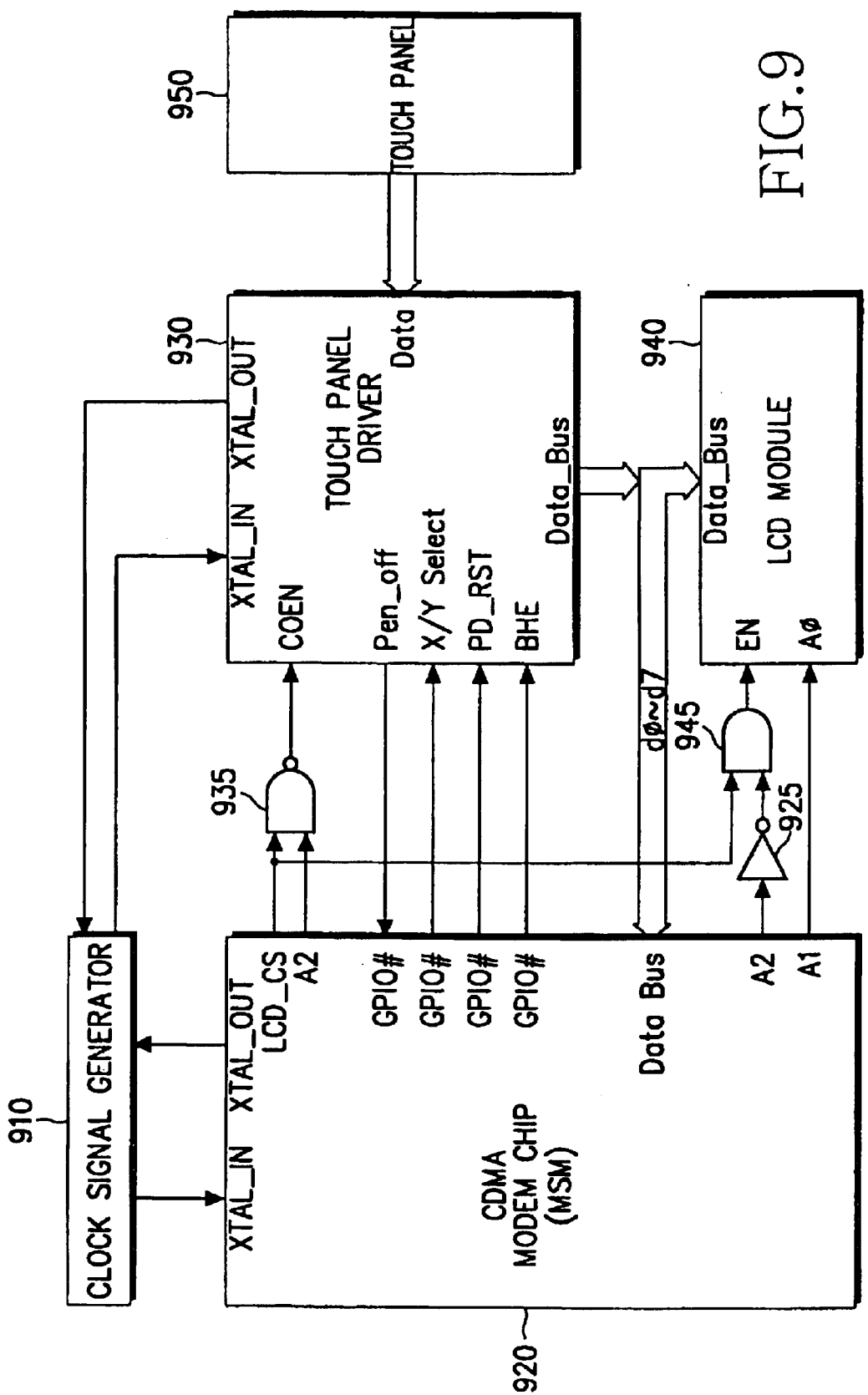
FIG. 9 is a block diagram illustrating a character-recognition system as part of a mobile communication terminal according to a sixth embodiment of the present invention.

FIGS. 7, 8 and 9 illustrate the fourth, fifth and sixth embodiments of the inventive character-recognition system, respectively. These embodiments provide alternate means for interfacing the character-recognition system when other interface devices are using the display selection pin LCD_CS, chip selection pin PCS6, RAM selection pin RAM_CS, ROM selection pin ROM_CS, EEPROM selection pin EEPROM_CS, etc. of the MSM. For example, when chip selection pin PCS6 is being used for another device, another terminal is required for interfacing the touch panel driver. In the present embodiments, the touch panel driver is preferably a TR88L803/804CS manufactured by TriTec Microelectronics Co., and the display module is preferably a UC-082907-FLHTX-A manufactured by Korean Samsung Electron Tube Co. Other LCD modules may be substituted for the UC082907-FLHTX-A provided they are functionally equivalent. The LCD module is provided with an activation input enable terminal EN, address terminal, and command/display data bus. It also has an internal buffer to store data received through the data bus connected with the CPU. The fourth, fifth and sixth embodiments of the character-recognition system are described in detail below:

Referring to FIG. 7, the touch panel driver enable input pin COEN of the touch panel driver 730 is connected with pin LCD_CS of modem chip 720 instead of pin PCS6 which is assumed to be dedicated to another device. The touch panel 750 converts the X and Y coordinate values representing a pressure trace made by a character written thereon into analog voltage variations. The analog voltage variations are then converted by an A/D converter provided in the touch panel driver 730 to corresponding digital coordinate data. The touch panel driver 730 includes touch panel enable input pin COEN, touch panel state output pin Pen_off, and 8-bit data bus pin Data_Bus to transfer the coordinate data, X/Y selection pin X/Y Select, power reset terminal PD_RST, and transmission speed control pin BHE, as described in the previous embodiments. The MSM chip 720 includes a general purpose write register output pin GP_WR, at least two general-purpose I/O pin, data bus Data_Bus, and LCD module selection pin LCD_CS for selecting the LCD module 140. The pin X/Y Select is connected with a general-purpose I/O pin GPIO of the MSM 720 to read the X and Y coordinate data produced by the touch panel driver from the same data bus. The pin COEN is connected with a first selection circuit 735 consisting of the pin LCD_CS of the MSM 720 and an inverter in order to match the data bus of the MSM 720 with the touch panel driver 730. Namely, detecting a signal input through the touch panel, the CPU of the MSM 720 activates pin LCD_CS to drive the touch panel driver 730 through the pin COEN, matching the data bus with the touch panel driver 730. The pin Pen_off is connected with a general-purpose I/O pin GPIO of the MSM 720 to inform the CPU of the data input through the touch panel 750. The CPU activates the pin LCD_CS in response to the output of the Pen_off. Then, the X/Y coordinate data and touch panel state data are inputted to the CPU.

In the present embodiment, the pin Pen_off is to drive the touch panel drivel 730 by polling. The CPU checks the pin GPIO at predetermined time intervals to detect the output of the pin Pen_off to activate the pin LCD_CS. The terminal PD_RST is connected with a general-purpose I/O terminal of the MSM 720 to cut off the power consumption of the touch panel driver 730 when the touch panel 750 is not used. This compensates for the power consumption caused by the touch panel 750 and touch panel driver 730 added to the ordinary mobile communication terminal according to the present invention. The pin BHE is connected with a general-purpose GPIO pin of the MSM 720 to transfer data having higher resolution than the ordinary 8-bit data from the touch panel 750. For example, in order to transfer 10-bit data, the CPU sets the pin BHE at high to initially transfer 8-bit data, and then at low to secondly transfer the remaining 2-bit data. This enables the character-recognition system to adjust resolution as desired.

Meanwhile, the LCD enable input pin EN is connected with the MSM 720 through a second inverting circuit 745 consisting of general-purpose write register output pin GP_WR of the MSM and an inverter. In this case pin LCD_CS of the MSM is needed to interface to the touch panel driver. This is possible because the LCD module 740 is exclusively used as an output device. However, since the pin GP_WR only supports a single address, it can not serve to separately transfer both command and display data to the LCD module, which is required to display both data. Namely, the LCD can not be normally interfaced only with the pin GP_WR. In order to resolve this problem, a general-purpose I/O pin of the MSM is connected with the address pin A0 of the LCD module 740. The data bus of the LCD module 740 is matched with the data bus of the MSM 720, commonly occupied by the touch panel driver 730. This saves the resources of the mobile communication terminal. In operation, when the CPU activates the pin GP_WR to send address data through the address output pin GPIO, the LCD module 740 is enabled to display the command and display data received from the CPU through the data bus. The clock signal generator 755 generates a reference clock signal for the MSM 720. In the present embodiment, the reference clock signal is frequency-divided into submultiples to generate a second reference clock signal used for the touch panel driver 720. This eliminates an additional clock signal generator for driving the touch panel driver 730.

The operation of the character-recognition system will now be described in accordance with the present embodiment. Upon detecting a character input through the touch panel 750, the CPU of the MSM 720 activates the LCD_CS through the first selection circuit 735 to drive the touch panel driver 730, so that the data bus of the MSM 720 is matched with the data bus of the touch panel 730 to read the X/Y coordinate data the CPU activate the character recognition mean, and get the result of the means. Then, the CPU activates the GP_WR and GPIO to transfer the command/display data to the LCD module 740. Namely, the output of the activated pin GP_WR is inverted by the second selection circuit 745 to enable the pin EN of the LCD module 740, and the output of the activated pin GPIO the address pin A0 thereof. Although the data bus is commonly occupied by the touch panel driver 730 and LCD module 740, the data collision is prevented because of both pin LCD_CS and GP_WR oppositely activated. This is due to the fact that the touch panel 750 is the input means and the LCD module the output means. Besides, the LCD module 740 usually includes a data storage buffer to continuously display the present data even if the data bus is matched with the touch panel driver 730.

FIG. 8 illustrates a character recognition system in accordance with a fifth embodiment of the present invention. The character-recognition system includes MSM 820, touch panel driver 830, touch panel 850, LCD module 840, and clock signal generator 810 as in the case of FIG. 7. However, the touch panel driver enable input COEN of the touch panel driver 830 is connected with a NAND gate 835 for NAND-gating the output signal of the read command output pin RD/ inverted by an inverter 822 and the output signal of the pin LCD_CS. In the present embodiment, the inverter 822 and the NAND gate 835 constitute a first selection circuit to select the touch panel driver. The first selection circuit may be composed of different elements than that described, so long as the combination is capable of functional equivalence. On the other hand, the terminal EN of the LCD module 830 is connected with an AND gate 845 for AND-gating the output signal of the write command output pin LWR/ of the MSM inverted by an inverter 824 and the output signal of the pin LCD-CS. The inverter 824 and the AND gate 845 constitute a second selection circuit to select the LCD module 840. This is possible due to the fact that the touch panel driver 830 serves only as the input means, and the LCD module 840 as the output means to display data. Namely, when the pin LCD_CS is activated, the touch panel driver 830 may be driven by activating the terminal RD/, and the LCD module 840 by activating the pin LWR/, so that the data bus may be matched with the touch panel driver 830 or the LCD module 840. In the present embodiment, the pin LCD_CS is used to drive both touch panel driver and LCD module in stead of using the pin GP_WR as shown in FIG. 7.

Similarly, the sixth embodiment of the present invention as shown in FIG. 9 includes MSM 920, touch panel driver 930, touch panel 950, LCD module 940, and clock signal generator 910. However, the touch panel driver enable input pin COEN of the touch panel driver 930 is connected with a NAND gate 935 for NAND-gating the output signal of the terminal LCD_CS and the address pin A2 of the MSM 920. The NAND gate 935 is called the third selection circuit in the present embodiment. On the other hand, the pin EN of the LCD module 940 is connected with an AND gate for AND-gating the output signal of the address pin A2 inverted by the inverter 925 and the output signal of the pin LCD_CS. The inverter 925 and the AND gate 945 constitute the fourth selection circuit. In the present embodiment, considering four addresses allowed for the pin LCD_CS of the MSM 920, a certain address bus A2 is used for the distinction signal to selectively drive the touch panel driver 930 and the LCD module 940, so that the data bus of the MSM 920 may be matched with the LCD module 940 or the touch panel driver 930. Also in the present embodiment is not used the general-purpose write output pin GP_WR of the MSM for interfacing the touch panel and display.

Figure 10:
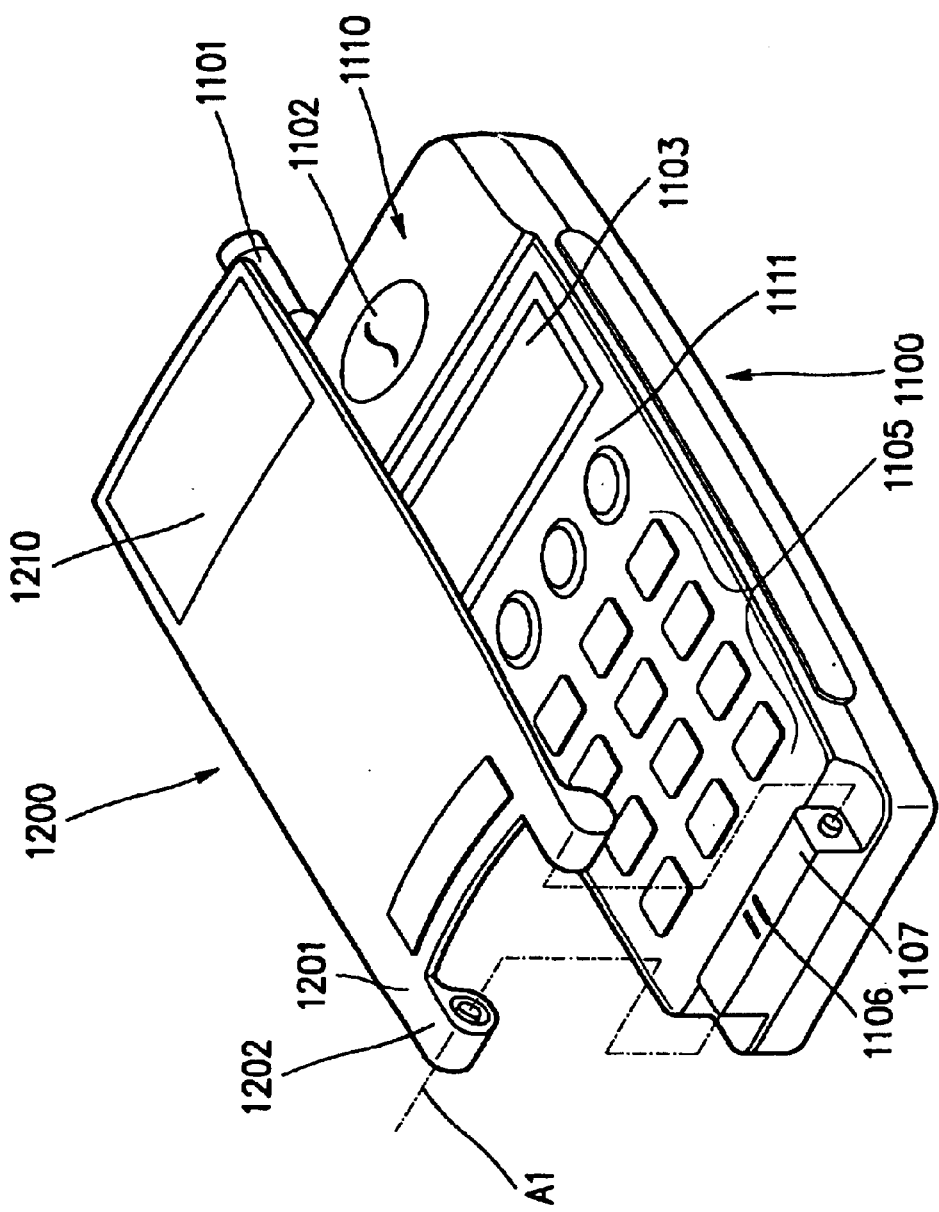
FIG. 10 is a perspective view for illustrating a flip-type mobile phone provided with the inventive character-recognition system with the flip cover detached from the housing.
Figure 11:
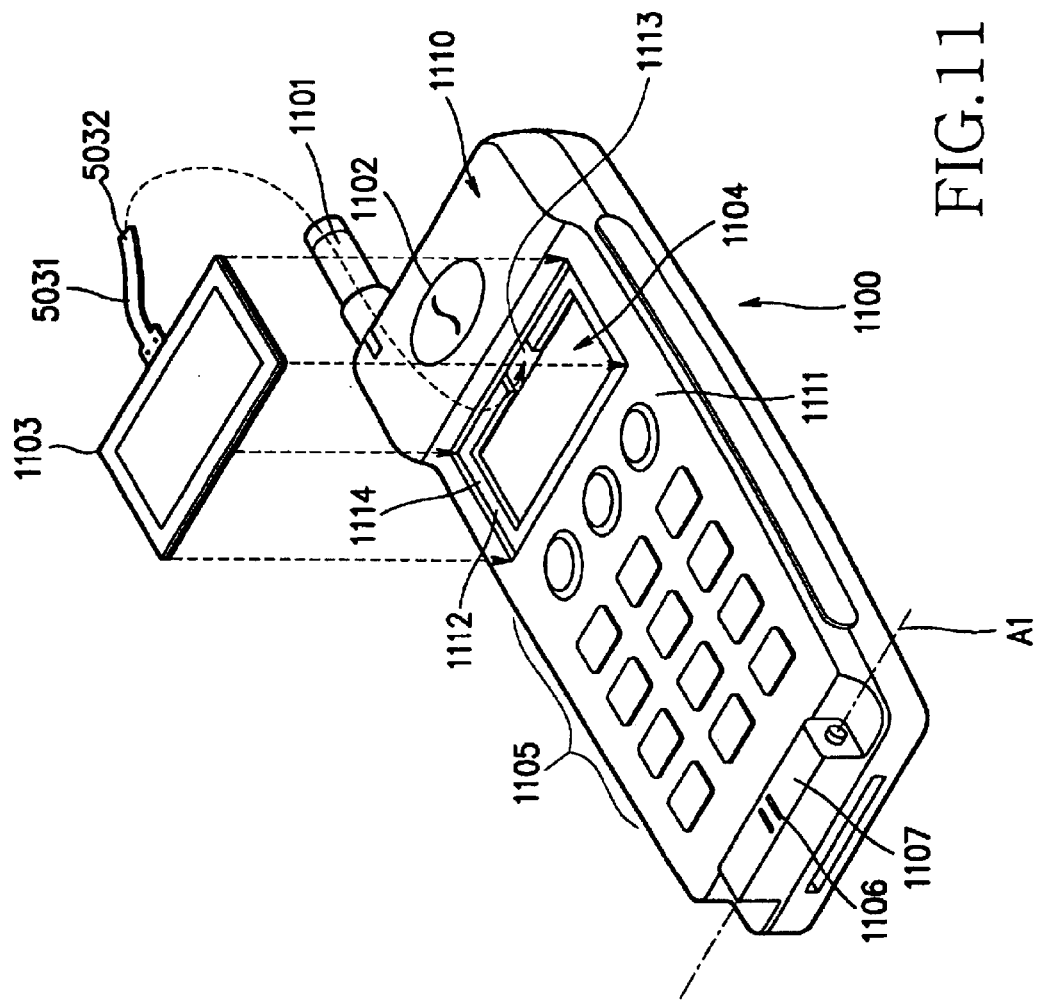
FIG. 11 is a perspective view for illustrating a touch panel being attached to the housing of a mobile communication terminal according to the present invention.

In order to install the inventive character-recognition system in the conventional mobile radio phone, various design factors must be considered including the position and size of the touch panel as well as means for attaching it to the housing of the mobile phone. Additionally required is means for protecting the touch panel from external force and maintaining it. Referring to FIGS. 10 and 11, there is shown a mobile cellular phone including a housing, key pad, touch panel, speaker, microphone, etc. As shown in FIG. 10, the flip-type mobile communication terminal comprises a housing 1110, a flip cover 1200, and a hinge structure 1106 for mechanically connecting the housing 1110 and flip cover 1200. Mounted on one side of the upper part of the housing is an antenna unit 1101. Below the antenna unit 1101 is mounted an ear piece 1102 including a speaker. The LCD module (see FIG. 11) is mounted below the ear piece 1102, and the touch panel 1113 laid thereon. Below the touch panel 1113 is formed the key pad 1105, below which is mounted the hinge structure 1107 containing the microphone 1106. The flip cover 1200 is turned about the central axis A1 of the hinge structure to cover the key pad 1105 and touch screen 1103. The flip cover 1200 includes a pair of necks 1201 on both sides of its base, and a hinge knuckle 1202 formed on the end of each neck. In addition, a plastic transparent window 1210 is formed in the flip cover 1200 so as to allow externally viewing of the touch screen 1103 when the flip cover closes the front surface of the phone body 1100. The transparent window 1210 protects the touch panel from external environment, allowing externally viewing of the data displayed on the touch panel 1103. The front surface 1111 of the housing 1110 is provided with a rectangular recess for accommodating the touch panel 1103. The touch panel 1103 is bonded onto the bottom 1112. The recess has two apertures, one 1114 of which is to provide a slight gap between the LCD module 1104 and the other 1113 to pass a flexible printed circuit 5031 for connecting the touch panel 1103 with the internal memory board. Namely, the conventional LCD transparent window is replaced by the touch panel 1103, and the aperture 1113 added to pass the flexible printed circuit 5031. The touch panel 1103 is mounted to face the LCD 1104 module with a slight gap therebetween. The flexible printed circuit 5031 consists of four conductor lines to define two dimensional coordinates of a character input.

Figure 12:
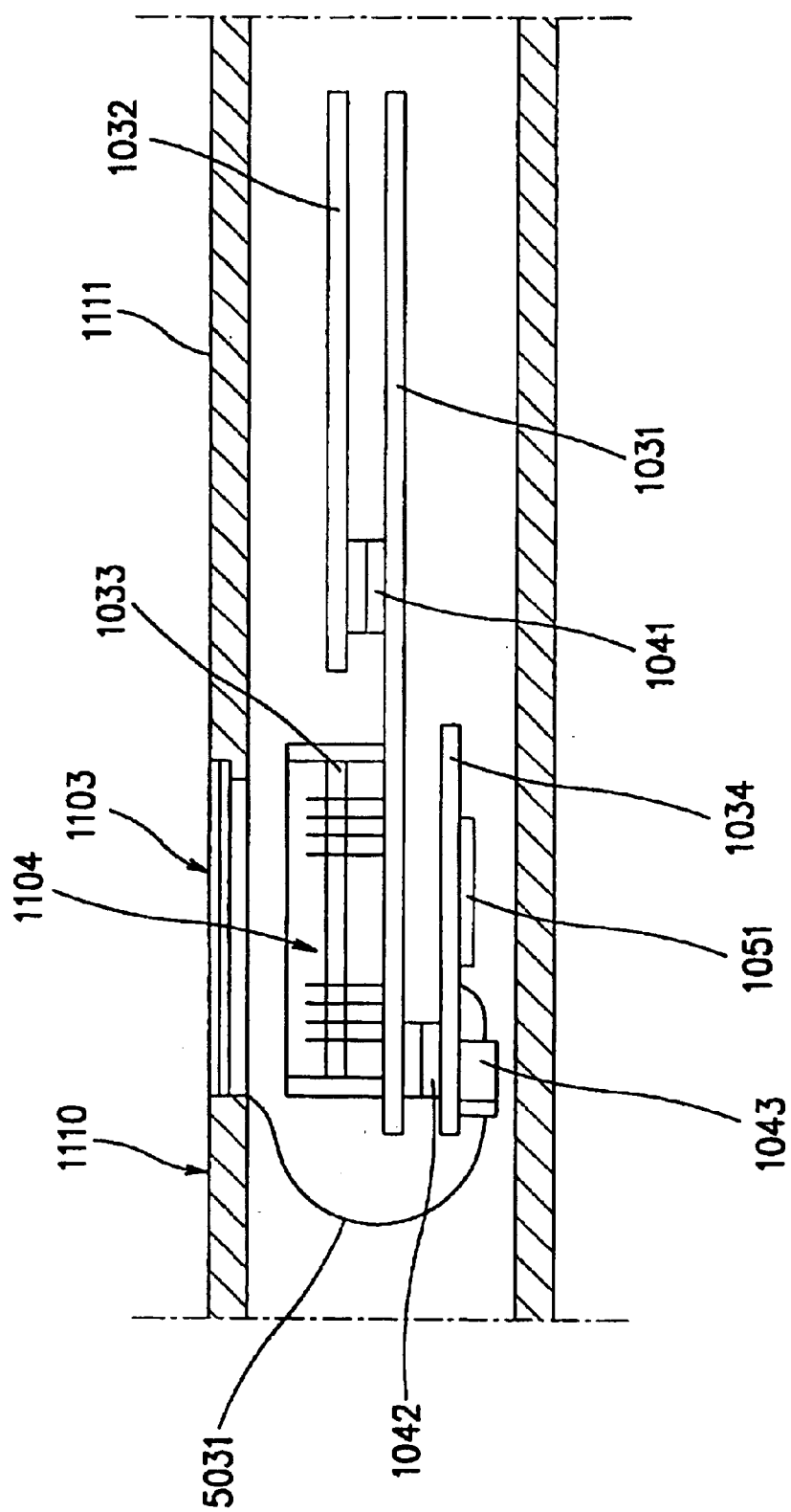
FIG. 12 is a cross sectional view for illustrating the relationship between various circuit boards and a touch panel installed in the housing of a mobile communication terminal according to the present invention.
Figure 13:
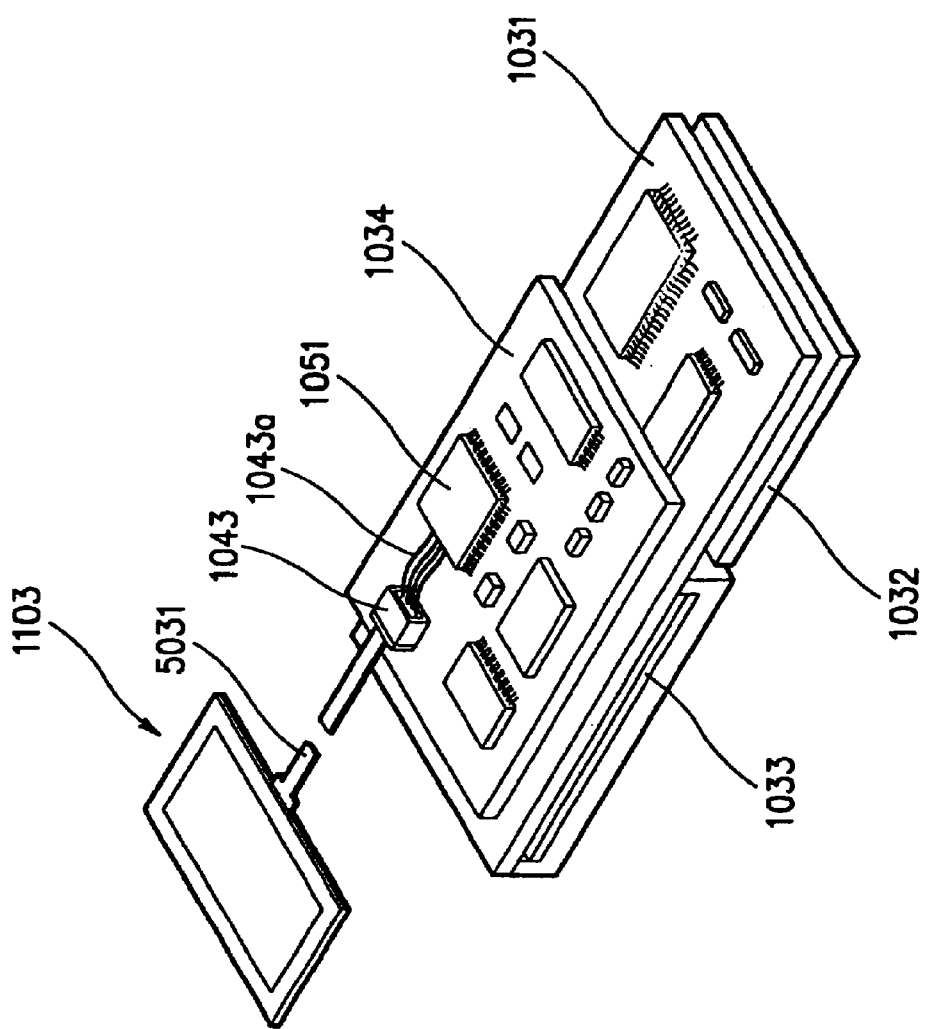
FIG. 13 is a perspective view for illustrating a touch panel electrically connected to a main circuit board mounted in the housing of a mobile communication terminal according to the present invention; and the driver output.

Referring to FIGS. 12 and 13, the mobile phone comprises four circuit boards. Mounted on the main board 1031 are the keypad board 1032 electrically connected via male-female connector 1041, the LCD board 1033 by soldering, and the memory board 1031 by male-female connector 1042. The flexible (FPC) extended from the touch panel 1103 is electrically connected to the connector 1043 detachably attached to the memory board 1034. The connector 1043 is electrically connected with the touch panel driver 1051 via four wires 1043a. Of course, the FPC 5031 may be directly connected with the LCD board 1033 and keypad board 1032 in stead of the memory board 1034.

It is also preferable to directly connect the FPC with the main board 1031. In this case, the four film-type conductor lines of the touch panel are directly soldered to the main board at a suitable region around the speaker. Or otherwise, a detachable connector may be exclusively used for such connection. Thus, when the touch panel is contacted by a finger or stylus, two dimensional coordinate data is generated transferred through the FPC to the main board, where it is converted into digital data processed by the touch panel driver.

Figure 14:
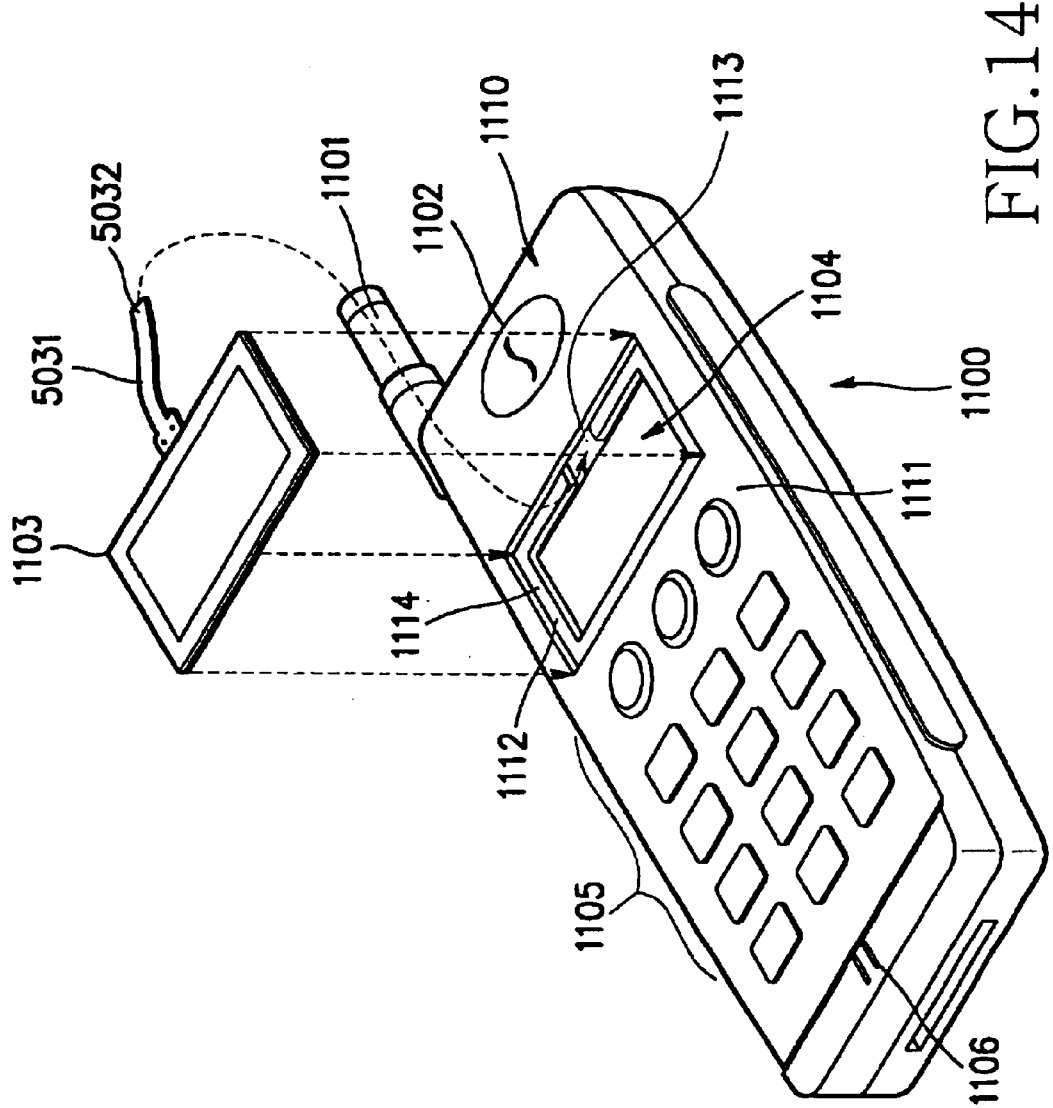
FIG. 14 is a perspective view for illustrating a touch panel being attached to the housing of a bar-type mobile communication terminal according to the present invention.

FIG. 14 illustrates the inventive character-recognition system applied to the ordinary bar-type mobile phone. Likewise, the mobile phone comprises a housing 1110 for enclosing a main board, an antenna 1101 mounted in one side of the upper part of the housing, an ear piece 1102 provided in the upper part of the housing, an LCD module 1104 installed in the inside of the housing below the ear piece, a touch panel 1103 laid over said LCD module 1104, a key pad 1105 mounted below the touch panel, and a microphone 1106 installed below the key pad. The touch panel 1103 is electrically connected through FPC 5031 with the main board, and exposed through the front surface of the housing.

While the present invention has been described in connection with specific embodiments accompanied by the attached drawings, it will be readily appreciated by those skilled in the art that various changes and modifications may be made thereto without departing the gist of the invention.

What is claimed is:

1. A character-recognition system for inputting character data in a digital mobile communication terminal, said character recognition system comprising:
   a display;
   a touch panel for generating electronic signals in response to pressures from written characters on a writing surface of said touch panel;
   a terminal Pen-off for periodically detecting whether or not the input of said character data is made through the touch panel for turning on the character-recognition system of the terminal;
   a touch panel driver for converting analog coordinate data into digital coordinate data, and outputting touch panel state data;
   a character data base for storing character data comprising shapes and number of strokes;
   character-recognition means for comparing said digital coordinate data and said number of strokes with corresponding character data stored in said character database, said character recognition means further providing addresses of said corresponding character data;
   a character code storage for storing character codes corresponding to the character data stored in said character data base; and
   a controller for:
      calculating stroke data of said written characters from said coordinate data and said touch panel state data;
      supplying said calculated stroke data to said character-recognition means;
      retrieving character codes from said character code storage corresponding to said addresses of said corresponding character data; and
      displaying said retrieved character codes on said display.

2. The character recognition system of claim 1 further comprising a display module interface comprising:
   a modem;
   a display selection circuit for converting general purpose write register signal from said modem into a display enable signal; and
   a display module adapted for receiving said enable signal, a command/display data selection signal generated from a general-purpose input/output terminal of said modem, and command/display data responsive to said command/display selection signal.

3. The character recognition system of claim 2 further comprising:
   means for receiving said enable signal;
   means for receiving a command/display data selection signal from of said modem; and
   means for receiving command/display data in response to said command/display data selection signal.

4. The character-recognition system of claim 2, further including:
   a touch panel for generating pressure data responsive to pressure traces from a character written to a writing surface by a pen-based input device;
   a touch panel driver selection circuit for converting a chip selection signal into a touch panel enable signal; and
   a touch panel driver for receiving said touch panel driver enable signal, and a data bus terminal for communicating the data received from said touch panel with said modem.

5. A character recognition method in a mobile communication terminal comprising the steps of:
   periodically detecting whether or not input of character data is made through use of a touch panel for turning on a character-recognition system of the terminal;
   determining whether or not input of character data on the touch panel is completed;
   comparing the input character data with character data stored in a character data base;
   determining whether character data from said character data base matches said input character data within a predefined error range; and
   displaying an input character on a display when said character data from said character data base matches said input character data within said predefined range.

6. The method of claim 5, wherein the detecting of input of character data is periodically achieved by interrupt or polling means.

7. The method according to claim 5, wherein the step of determining whether input of character data to said mobile communication terminal is complete, is performed while said mobile communication terminal is in a character-recognition mode.

8. A character-recognition system for recognizing character data in a digital mobile communication terminal, said character recognition system comprising:
   a modem for periodically detecting whether or not the input of character data is made through a touch panel for turning on the character-recognition system of the terminal;
   said touch panel generating X/Y coordinate data responsive to pressure traces from a touch panel pen; and
   a touch panel driver operatively coupled to said modem, wherein said driver receives from said modem a chip selection signal and an X/Y selection signal when the touch panel is driven, said driver further transfers said X/Y coordinate data to said modem.

9. A method for inputting character data in a mobile communication terminal including a modem chip, a touch panel for generating X/Y coordinate data, a touch panel driver for transferring said X/Y coordinate data from said touch panel to said modem, said method comprising the steps of:
   periodically polling or interrupting said touch panel driver to check the transmission of a touch panel state signal to drive the touch panel driver for turning on a character-recognition system of the terminal;
   generating a chip selection signal upon detection of said touch panel state signal;
   transferring said X/Y coordinate data from said touch panel through said touch panel driver to said modem chip in response to said chip selection signal; and
   processing said X/Y coordinate data according to said touch panel state signal.

10. A character-recognition system for recognizing characters input to a digital mobile communication terminal, said character recognition system comprising:
    a touch panel for generating X/Y coordinate data and state data;
    a touch panel driver including a data bus operatively coupled to said touch panel, wherein said touch panel driver generates a touch panel state signal upon detecting said X/Y coordinate data and said state data, and further converts said X/Y coordinate data and said state data into digital X/Y coordinate data and digital state data;

a memory for storing character codes;

a modem having a central processing unit (CPU) operatively coupled to said touch panel driver, wherein said CPU periodically detects whether or not the input of character data is made through the touch panel for turning on the character-recognition system of the terminal; said CPU generates an enable signal responsive to receiving state data from said touch panel in order to connect a data bus terminal of said modem with said data bus of said touch panel driver; said CPU reads from said memory a character code corresponding to said digital X/Y coordinate data and digital state data received from said touch panel driver; said CPU supplies said character code to a display; and said CPU further determines whether or not input of character data on the touch panel is completed.

11. A character recognition method in a digital mobile communication terminal, the mobile telecommunication terminal including a touch panel for generating touch panel state data responsive to electronic signals from pressure traces from a character input supplied by a pen-based input device; a touch panel driver for converting said data received from said touch panel into digital data; a modem; and a memory for storing character codes; said method comprising:

setting said mobile communication terminal into a character-recognition mode;

periodically detecting a touch panel state signal generated in response to a character being written to a writing surface of said touch panel for turning on a character-recognition system of the terminal;

determining whether or not input of the touch panel state signal is completed;

reading the coordinate data of said character corresponding to an X/Y coordinate data generated from said touch panel driver upon detecting said touch panel state signal;

identifying input character data by a character data base within a given error range; and reading from said memory for storing character codes a character code corresponding to said coordinate data.

12. The method of claim 11, wherein the step of detecting a touch panel state signal generated in response to a character being written to a writing surface of said touch panel is performed by polling a touch panel output at a predetermined time interval.

13. The method of claim 11, wherein the step of detecting a touch panel state signal generated in response to a character being written to a writing surface of said touch panel is performed by detecting an interrupt signal generated by said touch panel in response to pen pressure from writing a character on said touch panel.

14. A character-recognition system for a mobile communication terminal, comprising:

a modem having a CPU which periodically detects a touch panel input signal in order to check the touch panel state for turning on the character-recognition system of the terminal;

a display selection circuit for converting output signals into a display enable signal;

a display module adapted for receiving said enable signal, a command display data selection signal generated from an address terminal of said modem, and command/display data responsive to said command/display selection signal;

a touch panel for generating pressure data responsive to pressure traces associated with a written character;

a touch panel drive selection circuit for converting output signals from said modem into a touch panel enable signal; and a touch panel driver for communicating said pressure data received from said touch panel with said modem, responsive to receiving said touch panel enable signal.

15. A character-recognition system for inputting character data in a digital mobile communication terminal, said character recognition system comprising:

display means;

input means for receiving handwritten character data;

means for reading coordinate data and touch panel state data from said handwritten character data;

first storage means for storing character data comprising coordinate data and stroke data of said written characters upon a first surface of said touch panel;

character-recognition means for comparing character data received from said touch panel with corresponding character data stored in a character database and providing addresses of said corresponding character data;

second storage means for storing character codes corresponding to the character data stored in said character data base; and a controller for:
periodically detecting whether or not the input of said character data is made through the touch panel for turning on the character-recognition system of the terminal;
delivering said stroke data to said character-recognition means;
retrieving character codes from said character code storage corresponding to said generated addresses of said corresponding character data; and
displaying means for displaying said character codes.

* * * * *